J. Q. ADAMS.
PRINTING FRAME.
APPLICATION FILED AUG. 28, 1915.
1,194,117.
Patented Aug. 8, 1916.
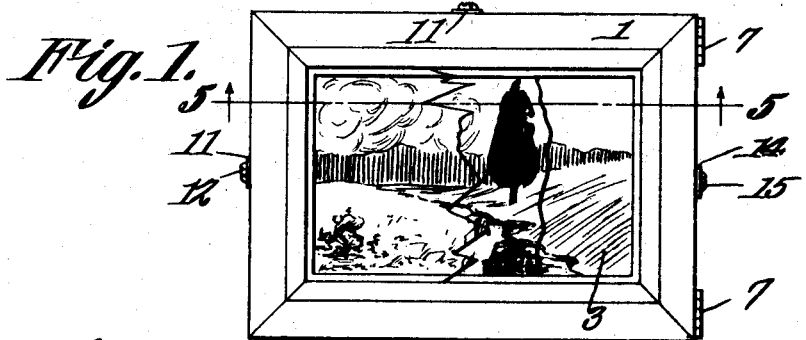
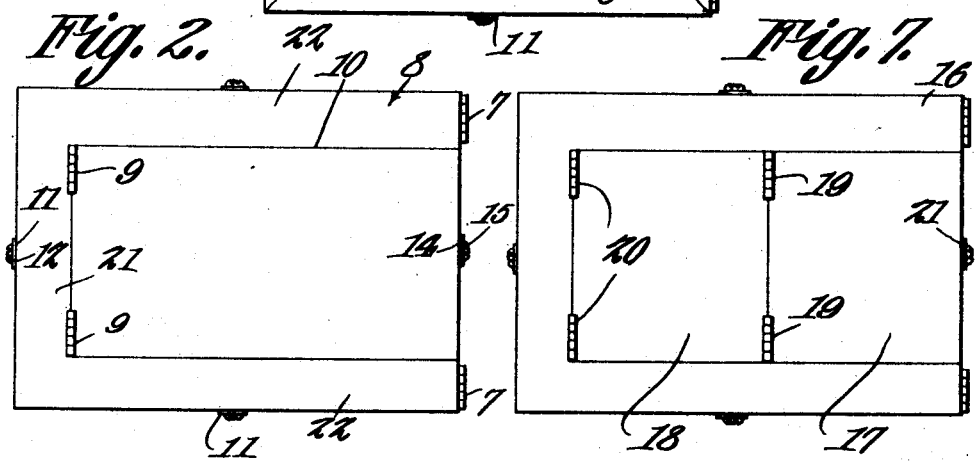
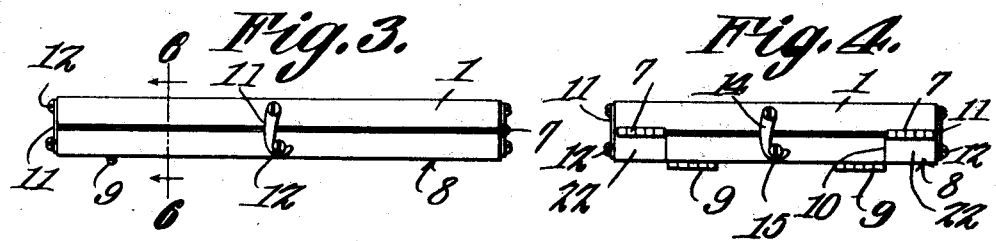
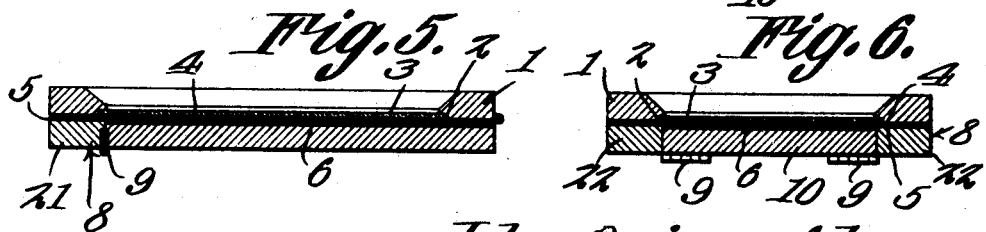
Witnesses
H. B. Wooden.
R. L. Parker.
John Quincy Adams
Inventor,
by C. A. Snow & Co.
Attorneys.

UNITED STATES PATENT OFFICE.

JOHN Q. ADAMS, OF FRANCES, WASHINGTON.

PRINTING-FRAME.

1,194,117. Specification of Letters Patent. Patented Aug. 8, 1916.

Application filed August 28, 1915. Serial No. 47,812.

*To all whom it may concern:*

Be it known that I, JOHN QUINCY ADAMS, a citizen of the United States, residing at Frances, in the county of Pacific, and State of Washington, have invented a new and useful Printing-Frame, of which the following is a specification.

The device forming the subject matter of this application is a printing frame, and one object of the invention is to provide a construction such that a negative or film together with the mat may be held in a fixed condition when the frame is opened to permit the change of sensitized paper.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows the invention in front elevation, parts being broken away; Fig. 2 shows the invention in rear elevation; Fig. 3 is a side elevation; Fig. 4 is an end elevation; Fig. 5 is a longitudinal section on the line 5—5 of Fig. 1; Fig. 6 is a cross section on the line 6—6 of Fig. 3; Fig. 7 is a rear elevation showing a modified form of the invention.

In carrying out the present invention there is provided a centrally opened front frame 1 having four sides, the frame 1 being provided with a recess 2 receiving a glass plate 3 upon which is superposed a film 4 overlapping the front frame 1, a mat 5 being superposed on the film 4, the mat 5 also overlapping the front frame 1. Superposed upon the film 4 is a sensitized sheet 6 which, however, does not overlap the front frame 1.

The invention comprises a U-shaped rear frame 8 including an intermediate portion 21 and arms 22. By means of hinges 7, the ends of the arms 22 of the frame 8 are connected to one end of the main or front frame 1. It will now be understood that the rear frame 8 and the front frame 1 coöperate to clamp the film 4 and the mat 5 firmly in place, the sensitized sheet 6 being freely removable from within the contour of the rear frame 8, without disturbing the position of the film and the mat.

Hinges 9 unite the intermediate portion 21 of the rear frame 8 with a closure 10 which fits within the contour of the rear frame 8. The closure 10 constitutes the means for holding the sensitized sheet 6 in place and in coöperating relation with respect to the film 4 and the mat 5.

Pivotally assembled with the sides and with one end of the front frame 1 are hooks 11 which, coacting with projections 12 on the rear frame 8 serve to hold the frames together, thereby to clamp the film 4 and the mat 5. Pivoted to one end of the front frame 1 as shown in Fig. 4 is a hook 14 which, coacting with the projection 15 on the free end of the closure 10 serves to hold the closure within the contour of the rear frame 8, so that the closure will engage and hold in place the sensitized sheet 6.

From the foregoing it will be observed that the film 4 and the mat 5 may be positioned properly with respect to the frames 1 and 8 and after the film and the mat are clamped in place between the frames, it is not necessary to loosen or shift the film and the mat when the sensitized sheet 6 is changed. This operation is of peculiar utility in connection with films upon which the object is not placed properly or symmetrically. Obviously, the film and the mat may be dispensed with, under which circumstances the glass plate 3 will represent an ordinary photographic negative.

In the modification shown in Fig. 7 of the drawings, the rear frame appears at 16. The closure comprises parts 17 and 18 united by hinges 19, the part 18 being connected with the intermediate portion of the frame 16 by means of hinges 20, and the part 17 of the closure being connected with the front frame by means of a hook and projection 21 of the sort hereinbefore described. That form of the invention which is disclosed in Fig. 7 is of peculiar utility in that the part 18 of the closure may be held down on the sensitized paper, to hold the same in place, the part 17 of the closure being swung away from the sensitized paper to the end that one portion of the sensitized paper may be examined from time to time as the printing operation progresses.

The structure herein disclosed preferably is adapted for post card printing but is applicable in connection with printing operations calling for the use of a sensitized sheet larger than an ordinary postcard.

Having thus described the invention, what is claimed is:—

1. In a device of the class described, a front frame; a U-shaped rear frame comprising an intermediate portion and arms; means for hingedly connecting the rear frame with the front frame; means for detachably connecting the front frame with the rear frame against hinging movement; a closure fitting within the rear frame; means for hingedly connecting the closure with the rear frame; and means for detachably connecting the closure with the front frame between the ends of the arms.

2. In a device of the class described, a front frame; a U-shaped rear frame comprising an intermediate portion and arms; a closure fitting within the rear frame; a hinge uniting the closure with the rear frame; hinges uniting the ends of the arms with the front frame; a detachable connection between the frames; and a detachable connection between the front frame and the closure.

3. In a device of the class described, a front frame; a U-shaped rear frame comprising an intermediate portion and arms; a closure fitting within the rear frame; a hinge uniting the closure with the intermediate portion of the rear frame; hinges uniting the ends of the arms of the rear frame with the front frame; a detachable connection between the frames; and a detachable connection between the front frame and the closure.

In testimony that I claim the foregoing as my own, I have hereto affixed my signature in the presence of two witnesses.

JOHN Q. ADAMS.

Witnesses:
C. J. SCHAEFFER,
R. L. EUBANKS.